United States Patent [19]
Highfill et al.

[11] Patent Number: 5,302,363
[45] Date of Patent: Apr. 12, 1994

[54] PROCESS FOR PREPARING ANHYDROUS POLYPHOSPHATE MIXED ALKALI METAL SALTS

[75] Inventors: Louis A. Highfill, Union, Mo.; George D. Rozelle, Evans, Ga.

[73] Assignee: Monsanto Company, St. Louis, Mo.

[21] Appl. No.: 55,345

[22] Filed: May 3, 1993

[51] Int. Cl.⁵ .............................................. C01B 25/30
[52] U.S. Cl. .................................................... 423/315
[58] Field of Search ........................................ 423/315

[56] References Cited

U.S. PATENT DOCUMENTS

| | | |
|---|---|---|
| 2,511,249 | 6/1950 | Durgin et al. . |
| 2,888,321 | 5/1959 | Bauman et al. . |
| 2,948,588 | 8/1960 | Bauman et al. . |
| 3,230,040 | 1/1966 | Metcalf et al. . |
| 3,372,984 | 3/1968 | Metcalf et al. . |
| 4,496,526 | 1/1985 | Loblich . |
| 4,725,369 | 2/1988 | Nathan et al. . |
| 4,777,026 | 10/1988 | Griffith . |
| 4,798,712 | 1/1989 | Peterson ........................ 423/315 |
| 4,857,287 | 8/1989 | Dick et al. . |

FOREIGN PATENT DOCUMENTS 1102892  2/1968  United Kingdom .

OTHER PUBLICATIONS

Van Wazer; Phosphorus and Its Compounds; 1958, pp. 608–611.

*Primary Examiner*—Wayne Langel
*Attorney, Agent, or Firm*—R. C. Loyer

[57] ABSTRACT

There is disclosed a process for preparing mixed alkali metal salts of tripolyphosphate. A solution of mixed orthophosphate salts, such as sodium and potassium is dried by spraying the mixture onto a hot tumbling bed of a mixture of phosphate salts. The dried salts are then calcined at a temperature in the range of from about 350° C. to about 600° C., preferably above 500° C. to form the mixed alkali metal salt of tripolyphosphate.

11 Claims, 1 Drawing Sheet

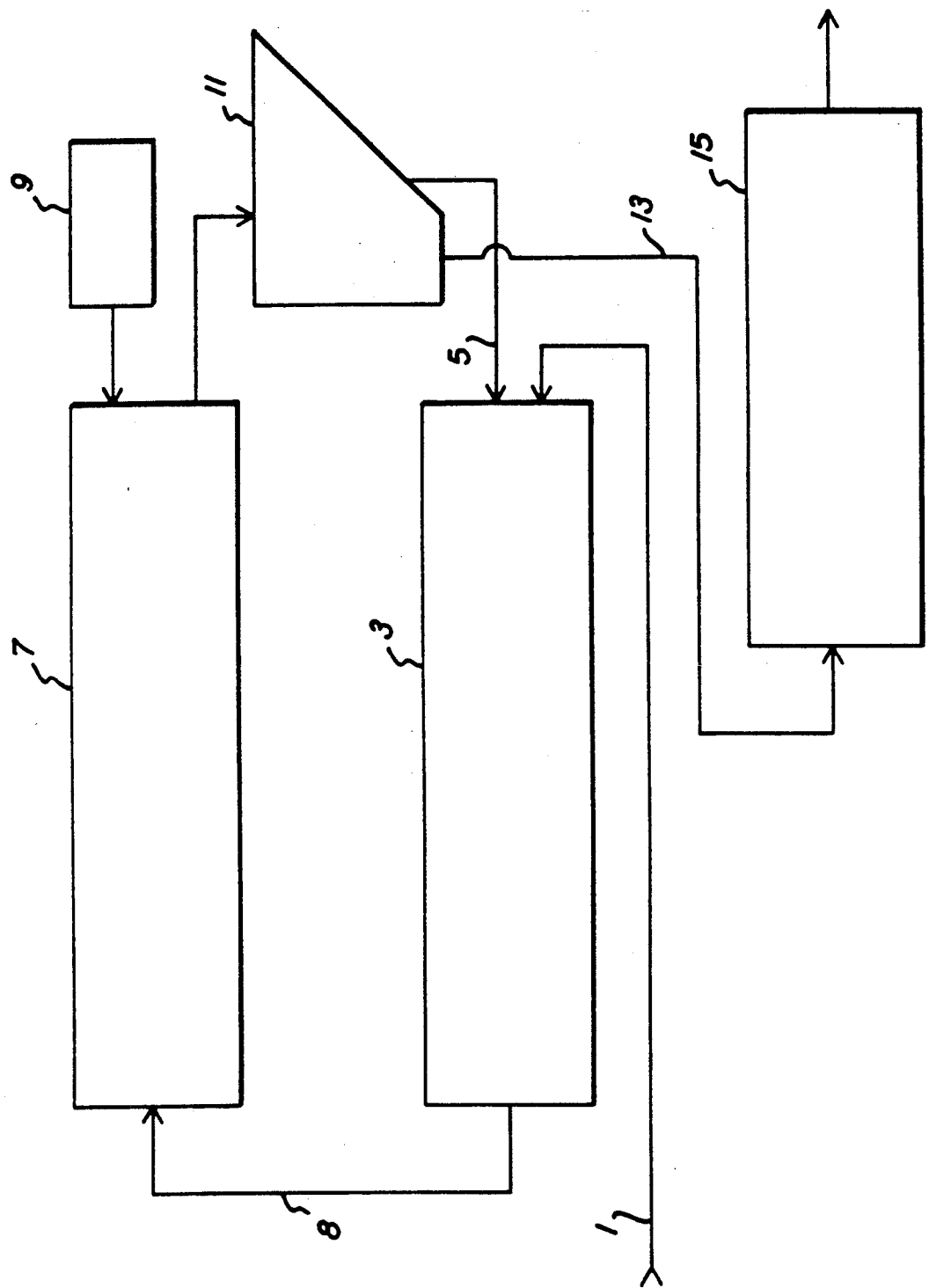

PROCESS FOR PREPARING ANHYDROUS POLYPHOSPHATE MIXED ALKALI METAL SALTS

The present invention related to mixed alkali metal polyphosphates. More specifically, the present invention relates to certain sodium and potassium mixed polyphosphates and to novel processes for their preparation.

BACKGROUND OF THE INVENTION

Mixed salts of tripolyphosphates (sodium and potassium) have been found to be highly desirable for use in food preparation and preservation because of the properties of such salts. While sodium tripolyphosphates have been employed as a detergent builder and in food products for many years, it was known that potassium tripolyphosphate was much more soluble in water and dissolved at a faster rate than sodium tripolyphosphate. Furthermore, its value in food products has been appreciated when the amount of sodium in the human diet was brought to the attention of the public by the medical profession. Of course, the use of the potassium salt would reduce the amount of sodium in food products and it is desireable to have a detergent builder that is readily soluble in water. However, there are many difficulties associated with the handling and use of potassium tripolyphosphate because it is deliquescent, prone to severe caking and difficult in general to ship, store and handle conveniently. Also, the potassium salt of tripolyphosphate is widely known to impart an undesirable taste to food products and therefore has not been used for that purpose.

One solution to the problems presented by the properties of potassium tripolyphosphate is the use of mixed sodium/potassium salts of tripolyphosphate. Such use would reduce the amount of sodium in the diet and the mixed salts exhibit increased solubility in water over the sodium tripolyphosphate salts. Cost has been one major factor which has limited the use of the mixed salt. More importantly, there has not been found a convenient, efficient process for producing large quantities of the mixed salt.

One early attempt to produce the mixed salts of tripolyphosphate is disclosed in U. K. patent 1,102,892. Such process starts with the phosphate ore which is digested with a solution of phosphoric acid. Sodium and potassium sulfate salts are then added to the solution which causes the calcium content of the ore to precipitate, leaving a solution of mixed orthophosphate salts. After filtering the solution containing the mixed salts is solidified in a multi-action evaporator. First, the water is removed from the solution to a sufficient extent to either eliminate free water or provide a concentrate containing between 48% to about 55%, by weight solids. If only a concentrated solution is left, it is mixed with an amount of desired end product, i.e., sodium potassium tripolyphosphate, previously prepared. In either case the dried product is then calcined at the usual temperatures employed to produce the mixed salt tripolyphosphate.

Another method of preparing the mixed tripolyphosphate salt is described in U.S. Pat. No. 3,372,984 to Metcalf et al. In this process a very concentrated aqueous slurry of sodium tripolyphosphate is prepared to which are added the appropriate amount of sodium and potassium bases. It is essential that the polyphosphate reactants are largely in the undissolved state. The dihydrate of the mixed salt is produced.

The improved solubility of the mixed tripolyphosphate salt is appreciated in the prior art as is shown by the disclosure of U.S. patent 4,857,287 to Dick et al. The product of the process disclosed therein desirably contains more that 75%, by weight, Form I sodium tripolyphosphate and 0.4% to about 0.8% potassium. According to said process an aqueous solution of sodium orthophosphate wherein the $Na_2O/P_2O_5$ ratio is from 1.60 to 1.67 and an appropriate amount of dissolved potassium is sprayed into a spray dryer maintained at a calcining temperature so as to produce tripolyphosphate. The product is reported to have improved caking properties and quickly dissolves in water.

Other mixed salts of condensed phosphates have been prepared by various processes. In U.S. Pat. No. 2,511,249 to During there is disclosed a process for preparing sodium potassium pyrophosphates. In this process a solution of mixed sodium and potassium orthophosphates is dried on a drum drier or other suitable surface and then subjected to calcining to form the trimetaphosphate which is reported to be water soluble.

An improvement in the process for preparing the sodium salt or sodium/potassium double salt is reported in U.S. Pat. No. 3,230,040 to Metcalf et al. Avoidance of water insoluble metaphosphates is achieved by rapidly increasing the temperature of the dried mixed orthophosphate salts. A solution of mixed orthophosphate salts is first dried on a drum drier and then prepared for calcining by appropriate milling and screening. Rapid heating such as by gas fired jets directed at the surface of the dried salt mixture achieves the objective of avoiding insoluble metaphosphates.

Preparation of other mixed salts, i.e., calcium/sodium of metaphosphate is described in U.S. Pat. No. 4,725,369 to Nathan et al. A slurry of mixed salts is heated to remove water and then calcined to provide the desired mixed salt metaphosphate in substantially crystalline form.

BRIEF DESCRIPTION OF THE INVENTION

In accordance with this invention there is provided a convenient process for preparing the mixed salt of polyphosphate efficiently in large volume which includes the steps of a. preparing a solution of at least two different alkali metal orthophosphate salts.

b. drying the mixed salt solution by spraying the solution onto a tumbling bed of mixed phosphate salts, and;

c. calcining the dried salt mixture at a temperature in the range of from about 350° C. to about 600° C. to form an alkali metal polyphosphate salt mixture containing at least two different alkali metal cation.

As employed herein, the term "mixed phosphate salts" means either a mixture of different alkali metal orthophosphate salts or crystalline, solid solutions of alkali metal polyphosphate salt having two different sodium and potassium cations.

It is known that when calcining alkali metal orthophosphate salts a mixture of compounds are produced even though the desired compound is the tripolyphosphate salt. At common calcining temperatures, such as from 350° to 600°, the product contains a major amount of tripolyphosphate and minor amount of trimetaphosphate and pyrophosphate. When material being calcined with a mixture of potassium and sodium ion a series of solid solutions (crystalline) occur where the mole ratio of $M_2O$ to $P_2O_5$ is:

$$2 > M_2O/P_2O_5 > 1.5$$

and $M_2O$ is a mixture of $Na_2O$ and $K_2O$. It is understood that crystals with ratios greater than 1.67 contain pyrophosphates, while crystals with ratios less than 1.67 contain metaphosphates. From the above it is seen that the process of this invention desirably provides a product containing the solid solutions of polyphosphates having an $M_2O/P_2O_5$ ratio of less than 2 and greater than 1.5 wherein the $M_2O$ is as defined above. Such process yields crystals of the general composition:

$$Na_3K_5P_3O_{10}$$

BRIEF DESCRIPTION OF THE DRAWING

In the attached drawing there is shown diagrammatically the portion of the process of this invention involving drying the solution of mixed orthophosphate salts as well as the calcining and cooling steps to prepare, for example, trisodium dipotassium phosphate.

DETAILED DESCRIPTION OF THE INVENTION

The present invention is directed to preparing polyphosphate salt mixtures containing at least two different alkali metal cations. The alkali meta cation are sodium, potassium, lithium and cesium. The preferred salts are tripolyphosphates containing a combination of sodium and potassium cations. Therefore, the invention is explained herein specifically directed to the preparation of trisodium dipotassium tripolyphosphate but any alkali metal polyphosphate salt mixture containing two dissimilar alkali metal cations may be prepared in accordance with the process of this invention.

The solution of mixed salts is most conveniently prepared by first forming the monosodium orthophosphate salt and then adding the potassium base in the ratio of 3 moles of sodium orthophosphate to 1 mole of potassium base. Generally, the hydroxides of the alkali metal bases are employed. The ratio of alkali metal cations in the tripolyphosphate is conveniently controlled by the appropriate addition of the two bases to form the ortho-phophate salt. One of ordinary skill can easily envision the addition of various ratios of two alkali metal bases to orthophosphoric acid whereby the mole ratio is carried into the tripolyphosphate product.

In the next step of the process of this invention the solution containing the mixture of orthophospharic acid salts is dried by being sprayed onto a bed of mixed sodium/potassium phosphate salts. In an initial start-up of an operation, the bed of mixed phosphate salts may be comprised of sodium and potassium orthophosphates in suitable ratio. However, after end product (tripolyphosphate) is being produced, a portion of it can be conveniently recycled from the calciner to the drying operation to maintain a bed of dried mixed phosphate salt onto which the solution of orthophosphate salts is sprayed.

Any suitable equipment capable of providing a tumbling bed may be employed in the drying step. One preferred apparatus is a rotary drier which contains a tumbling mass of mixed phosphate salts. The sprayed solution of mixed salts is directed onto the bed of previously dried mixed phosphate salts to avoid the side walls of the dryer apparatus. It has been found that when the mixed orthophosphate salt solution contacts the surface of the dryer apparatus there is a tendency for said mixed salt to adhere to the surface of the dryer rolls forming an adherent coating. For this reason, dryers such as drum dryers have been found to be of little use in providing high volume output without employing a starting bed of dried material in a tumbling state. Typically, a rotary drier creates sufficient tumbling of the bed by the tumbling action of normal operation.

The drying operation usually takes place at a temperature in the range of from about 250° C. to about 450° C. and preferably in the range of from about 350° C. to about 400° C. At such temperatures the mixture of orthophosphate salts are produced in substantially anhydrous form and well blended for feed to the calciner.

The bed upon which the solution of mixed orthophosphate salts are sprayed may be, initially, a dry mixture of potassium and sodium orthophosphate salts, either hydrated or anhydrous. At that point, a homogeneous mixture is fed to the calciner. Sufficient amount of the dry mixture of orthophosphate salts is required to run the process until end product is produced out of the calciner. Once end product is produced out of the calciner a portion of it can be recycled to the dryer to form a hot bed upon which the solution of mixed orthophosphate salts is sprayed. Such embodiment has been found to be the most efficient manner of operating the process of this invention. Operation of the calciner is then adjusted to accept the heterogeneous feed comprising trisodium dipotassium tripolyphosphate and the dried mixture of sodium and potassium orthophosphate salts.

Operating conditions for the initial start-up and continuous operation with recycle of end product are substantially the same as is known for the conversion of orthophosphate salts to tripolyphosphate by condensation reaction at high temperature. Typically the start-up temperature (product temperature) of the calciner is in the range of from about 350° C. to about 600° C. When steady state conditions are achieved (recycle of end product), the temperature range which provides the highest amount of desired product has been found to be in the range of from about 500° C. to about 600° C. and usually about 550° C. At such temperatures the product will contain above 98% desired tripolyphosphate product with little or no trimetaphosphate which would contribute to the amount of insolubles in the product.

In the usual process of this invention, the product from the calciner is cooled and then milled to the desired particle size. Fines may be recycled and made a part of the tumbling bed in the drying operation.

DETAILED DESCRIPTION OF THE DRAWING

To more clearly describe the improved process of this invention there is shown in the attached drawing a diagram of the inventive process. In the drawing there is shown feed line 1 carrying a solution of mixed sodium and potassium orthophosphate salts in proper ratio of sodium/ potassium ions of 3:2. The solution is sprayed into the dryer 3 which contains a rolling bed, not shown. To provide continuously such bed there is shown line 5 carrying end product into the dryer. The tumbling action of the bed is achieved by any conventional means and, for example, in a rotary dryer, the rotary motion of the dryer is sufficient to provide such fluidization by the tumbling action. Flights in the dryer aid in such action.

After coursing through the dryer, the dried product is conveyed by any conventional means to calciner 7. Not shown in the drawing is any desired milling and sizing operation which may be performed on the dried mixture of orthophosphate salts. The means of conveyance is generally shown in the drawing by line 8. Calciner 7 shown in the attached drawing is of the counter-current design wherein hot gases are introduced into the calciner at the opposite end of the device from the end into which the feed material is introduced. Block 9 represents the burner employed to produce the hot gases which maintain calcining temperature, expressed above as the temperature of the product at the exit end of the calciner.

The calcined product is collected into any suitable receptacle, shown in the attached drawing as divided hopper 11. A measured amount of the calcined product is taken from the hopper and recycled to the dryer through previously mentioned line 5. Metering means to regulate the amount of recycled product is not shown and may take any suitable conventional form. The main product line, line 13 is shown conducting the end product to optional cooler 15 which is of conventional design so as to cool the desired product before the milling operation.

There has been provided, in accordance with the instant invention, a highly convenient and efficient process for the preparation of mixed alkali metal salt of tripolyphosphate. While the invention has been described with respect to various specific embodiments thereof, it is understood that the invention is not limited thereto and that many alternatives, modifications and variations will be apparent to those skilled in the art in light of the foregoing description. Accordingly, it is intended to embrace all such alternatives, modification, and variations as fall within the spirit of and broad scope of the invention.

What is claimed is:

1. A process for preparing a mixed alkali metal polyphosphate salts which comprises the steps of:
   a. preparing a solution of a mixture of alkali metal orthophosphate salts;
   b. drying said salt solution by spraying the solution onto a hot tumbling bed of a mixture of phosphate salts, and;
   c. calcining the dried salt mixture at a temperature in the range of from about 400° C. to about 600° C. to form a mixed alkali metal polyphosphate salts containing a major amount of tripolyphosphate, said salts comprising a crystalline, solid solution having an $M_2O/P_2O_5$ ratio less than 2 and greater than 1.5 wherein $M_2O$ is a mixture of $Na_2O$ and $K_2O$ in a molar ratio of 3:2 respectively.

2. The process of claim 1 wherein at least one of the alkali metal orthophosphate salts is sodium.

3. The process of claim 1 wherein the calcining temperature is at least 500° C.

4. The process of claim 1 wherein the solution of orthophosphate salts is prepared by adding alkali metal bases to orthophosphoric acid.

5. A process for preparing a mixed sodium potassium tripolyphosphate salts which comprises the steps of:
   a. preparing a solution of a mixture of sodium and potassium orthophosphate salts;
   b. drying said salt solution by spraying the solution onto a tumbling bed of mixture of sodium and potassium phosphate salts, and;
   c. calcining the dried salt mixture at a temperature in the range of from about 350° C. to about 600° C. to form a crystalline solid solution of trisodium dipotassium tripolyphosphate having an $M_2O/P_2O_5$ ratio in the range of less than 2 and greater than 1.5 wherein the $M_2O$ represents the mixture of $Na_2O$ and $K_2O$ in a molar ratio of 3:2 respectively.

6. The process of claim 5 wherein the tumbling bed comprises a mixture of sodium and potassium orthophosphates salts.

7. The process of claim 5 wherein the tumbling bed comprises crystalline solid solutions of tripolyphosphate having the composition $Na_3K_2P_3O_{10}$.

8. The process of claim 5 wherein the calcining temperature is at least 500° C.

9. The process of claim 5 wherein the tumbling bed is initially comprised of a mixture of sodium orthophosphate and potassium orthophosphate and then, after production of end product, a portion of end product is recycled to the dryer to form said bed.

10. The process of claim 5 wherein the solution of orthophosphate salts is prepared by adding sodium hydroxide and potassium hydroxide to orthophosphoric acid.

11. The process of claim 10 wherein the sodium hydroxide is added to the orthophosphoric acid followed by the addition of potassium hydroxide.

* * * * *